Oct. 15, 1929.  M. HARRISON  1,731,742
TOASTING MACHINE OR LIKE DEVICE
Filed Oct. 5, 1925  2 Sheets-Sheet 1
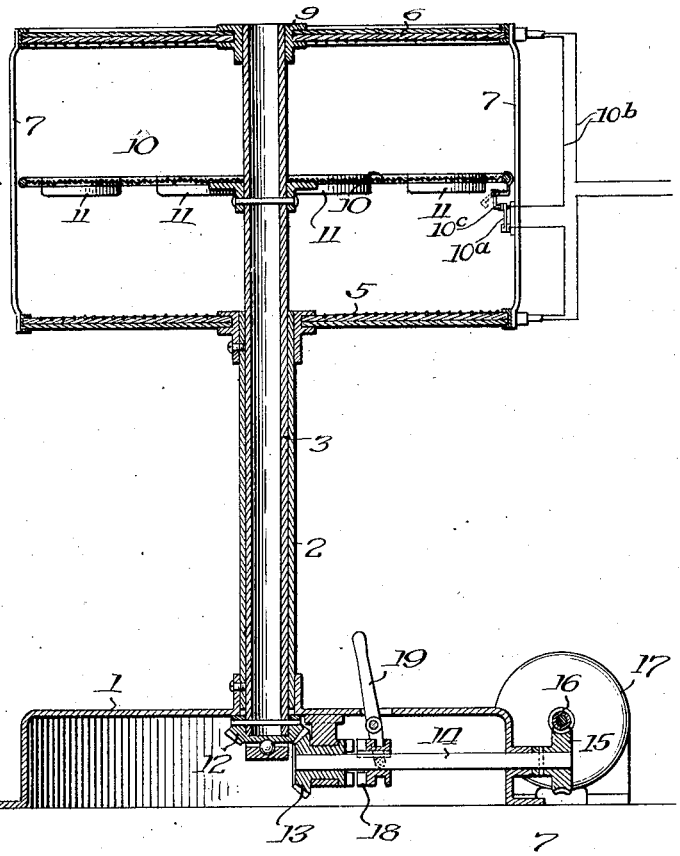
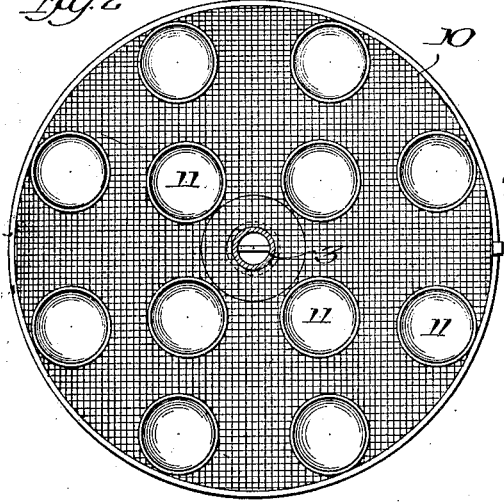 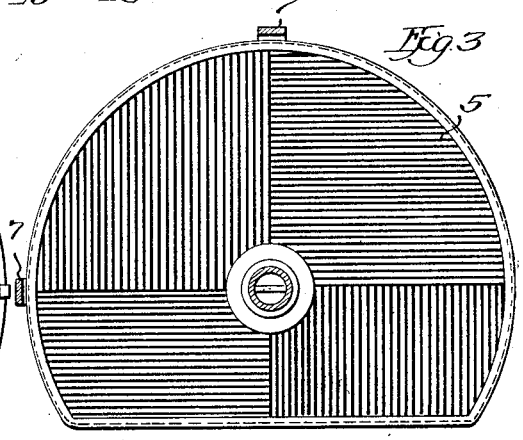
Inventor
Monroe Harrison Oct. 15, 1929.  M. HARRISON  1,731,742
TOASTING MACHINE OR LIKE DEVICE
Filed Oct. 5, 1925   2 Sheets-Sheet 2
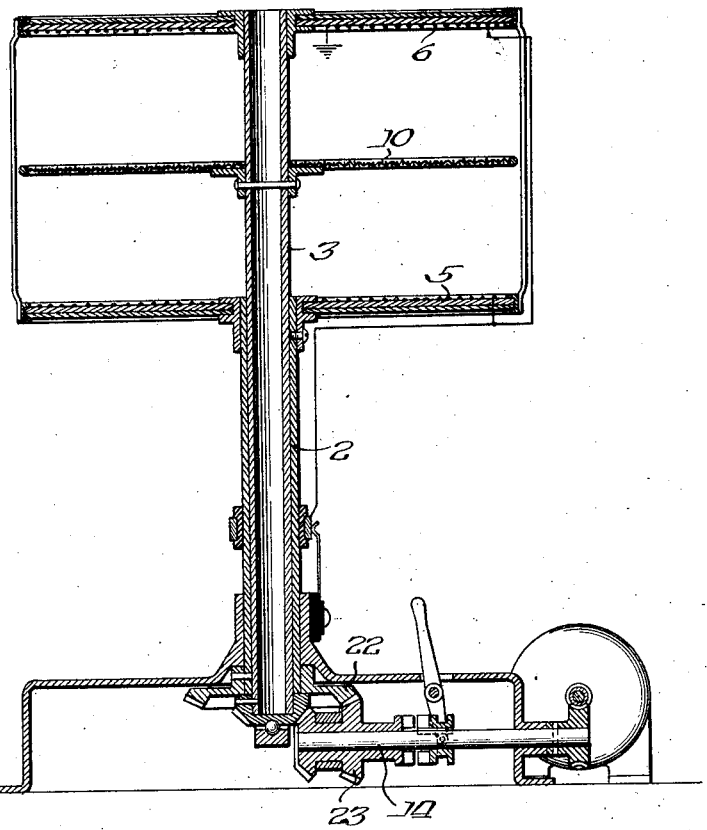
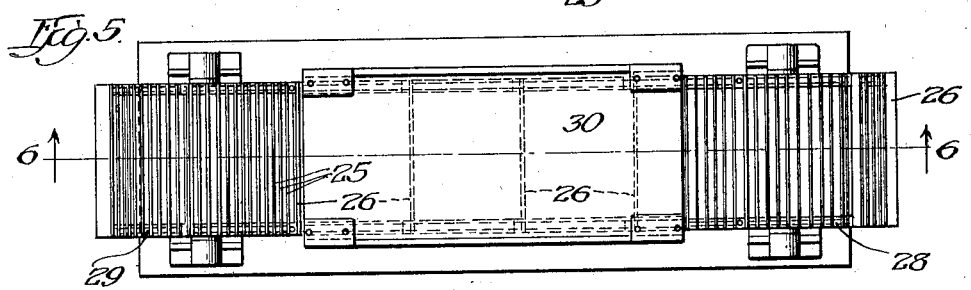
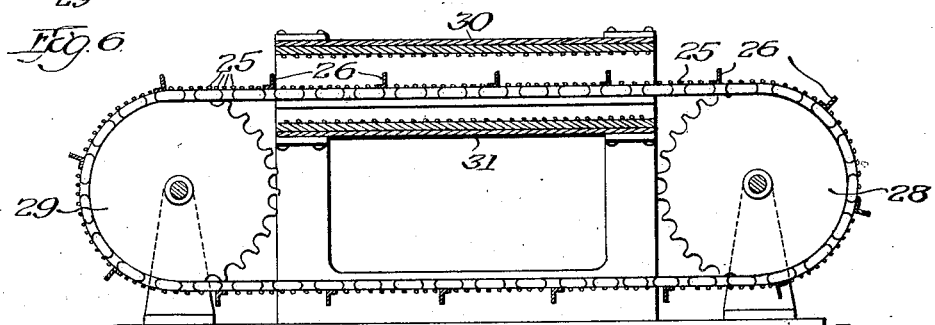

Patented Oct. 15, 1929

1,731,742

UNITED STATES PATENT OFFICE

MONROE HARRISON, OF CHICAGO, ILLINOIS

TOASTING MACHINE OR LIKE DEVICE

Application filed October 5, 1925. Serial No. 60,418.

My invention relates to toasting machines or like devices for heating, toasting or cooking, or similarly treating articles of food.

One of the objects of the invention is to provide a simple, practical and effective machine of the class specified.

Another object of the invention is to arrange for the effective heating or toasting of the articles and to arrange for their ready and easy placing in the machine and removal therefrom.

In the accompanying drawings Fig. 1 is a vertical section of a toasting or like machine embodying my invention;

Fig. 2 is a plan view of the element for carrying the articles of food;

Fig. 3 is a plan view of one of the heating elements;

Fig. 4 is a vertical section of a modified form of device;

Fig. 5 is a plan view of a further modification; and

Fig. 6 is a cross section on line 6—6 in Fig. 5.

Referring to the drawings, and particularly to Figs. 1, 2 and 3, I show a machine in which a base 1 supports an upright 2, preferably made tubular and containing another upright member 3 also preferably made tubular, the member 3 extending up beyond the upper end of member 2.

Member 2 carries at its upper end a heating element 5 conveniently circular in form, but with a segment cut off, as shown in Fig. 3. This heating element is preferably made of a series of parts or sections of coiled electrical resistance wire which furnishes heat by the passage of an electric current. Another heating element 6 is arranged above heating element 5 and secured to and supported by the latter by means of uprights 7—7. Element 6 is preferably made just as element 5 is, and is conveniently provided with a central aperture having a collar 9 to permit it to be held in place by the upper end of tubular member 3.

Tubular member 3 carries a holder 10 for the articles to be toasted or heated or otherwise treated. This element 10 is preferably in circular form, as shown in Fig. 2, and may be provided with a series of recesses or depressions 11—11 adapted to form seats or cup-like members for biscuit, sandwiches, or the like. Element 3 is arranged for rotation so that the articles of food which it carries may be moved around with it, a simple arrangement being to provide lower end of element 3 with a gear connection by means of pinions 12 and 13 with a rotary shaft 14, which latter is connected by worm wheel 15 and worm 16 with electric driving motor 17. A clutch 18 having a handle 19 is arranged to make connection so that element 3 may be driven by motor 17 or may remain stationary, as desired.

In using the device the sandwiches or biscuit or other articles of food, as desired, are placed on carrier 10 and the latter rotated so that the articles of food will move from the front where they are placed and where carrier 10 is uncovered by reason of cut-away portion in heating elements 5 and 6, to the rear of the machine where said articles are heated or toasted by the heating elements arranged above and below them. Thus the articles may be put on and then carried around in the machine and when they come again to the front they are toasted or properly heated and may be removed to be served and eaten.

A switch $10^a$ is preferably placed in the circuit $10^b$ so that said circuit may be opened and closed to cause the heating elements 5 and 6 to operate or not.

As a preferred arrangement a projection $10^c$ is placed on the rotary member 10 and arranged to actuate said switch $10^a$ so as to open the circuit $10^b$ and throw the heating devices 5 and 6 out of operation. By means of switch $10^a$ this will be done automatically when member 10 is so rotated as to cause member $10^c$ to strike switch $10^a$.

Preferably member $10^c$ is jointed or hinged so that it may be thrown into position indicated in dotted lines in Fig. 1, in which position it will not strike switch $10^a$. Thus rotation of member 10 may be continued as long as desired with heating devices operated, but by moving member $10^c$ the same may be brought in position to strike switch 10ᵃ and open circuit and thereby render heating devices inoperative and so prevent burning or overheating of the food articles.

Referring to Fig. 4, the food carrying element or holder 10 is similarly mounted on a rotary upright tubular member 3 and the heating elements 5 and 6 are mounted on tubular upright 2 as before, but this latter member 2 is also rotated so as to rotate heating elements 5 and 6. This rotation may be accomplished by providing member 2 also with gearing to drive it from shaft 14 as by means of pinion 22 and gear 23. The gearing ratio is such that food carrier 10 and heating elements 5 and 6 will be moved to the back of the machine and then out again before the heating elements have completed their rotation.

In Figs. 5 and 6 I show further modification in which the food carrier is in the form of a traveling belt 25 provided with cross slats or beams 26—26 to engage the articles of food and move them along. This belt 25 may be mounted on toothed wheels 28 and 29 and the latter driven by a suitable motor or driving connection. The heating elements 30 and 31 are shown, respectively above and below belt 25 so that as the latter is moved along the articles may be heated or toasted.

In this form of device the articles will be placed upon the traveling belt 25 before it enters the heating chamber or compartment and then they will emerge from the other end of said compartment and may be taken off or will be dumped off on to a tray or platform as the belt moves downwardly along the periphery of the other supporting gear wheel.

In all forms of the machine the exposed part of the food carrying element may be seen and will attract attention, so that the machine will serve also as a display or advertising device.

It will be understood that changes and modifications may be made without departing from the spirit of the invention.

What I claim is:

1. A machine of the class specified comprising an upright rotary member carrying near its upper end a radially arranged food holding member and a heating element arranged above the food holding member, and a tubular member arranged outside of said rotary member and carrying a heating element arranged below the food carrying member.

2. A machine of the class specified comprising an upright rotary member carrying near its upper end a radially arranged food holding member and a heating element arranged above the food holding member, a tubular member arranged outside of said rotary member and carrying a heating element arranged below the food carrying member, means for driving said rotary upright member, and a clutch device for throwing the driving mechanism into and out of operative relation.

3. A machine of the class specified comprising an upright rotary member carrying near its upper end a radially arranged food holding member and a heating element arranged above the food holding member, a tubular member arranged outside of said rotary member and carrying a heating element arranged below the food carrying member, means for driving said rotary upright member, a clutch device for throwing the driving mechanism into and out of operative relation, and means for holding the tubular member in stationary position.

4. A device of the class specified having a rotary member carrying a rotary holder and a stationary tubular member enclosing said rotary member and provided at its upper end with a heating element.

5. A device of the class specified having a rotary member carrying a rotary holder and a stationary tubular member enclosing said rotary member and provided at its upper end with a heating element and an upper heating element arranged above the rotary holder and supporting means extending upwardly from the lower heating element so as to support the upper heating element.

In witness whereof, I hereunto subscribe my name this 1st day of October, A. D. 1925.

MONROE HARRISON.